US008589382B2

(12) United States Patent  (10) Patent No.: US 8,589,382 B2
Betawadkar-Norwood et al.  (45) Date of Patent: Nov. 19, 2013

(54) MULTI-FACT QUERY PROCESSING IN DATA PROCESSING SYSTEM

(75) Inventors: Anjali Betawadkar-Norwood, Campbell, CA (US); Eileen Tien Lin, San Jose, CA (US); Tam Minh Dai Tran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 13/340,288

(22) Filed: Dec. 29, 2011

(65) Prior Publication Data

US 2013/0173528 A1  Jul. 4, 2013

(51) Int. Cl.
*G06F 17/30* (2006.01)

(52) U.S. Cl.
USPC .......... 707/713; 707/706; 707/722; 707/736; 707/758; 707/781

(58) Field of Classification Search
USPC .................................................. 707/600–899
See application file for complete search history.

(56) References Cited

U.S. PATENT DOCUMENTS

| 7,296,040 B2 | 11/2007 | Cazemier et al. |
| 2006/0129564 A1 | 6/2006 | Shah et al. |
| 2008/0059439 A1* | 3/2008 | Fan et al. .......................... 707/4 |

* cited by examiner

*Primary Examiner* — Isaac M Woo
(74) *Attorney, Agent, or Firm* — Shumaker & Sieffert, P.A.

(57) ABSTRACT

Techniques are described for optimizing a multi-fact star schema query to retrieve data from two or more fact tables of a database. The optimization techniques may include internally transforming a received multi-fact star schema query into a group of single-fact sub-queries, thereby reducing or eliminating certain constraints during query processing. The group of sub-queries may be enumerated to determine a query execution plan. The multi-fact star schema query may be executed according to the query execution plan to retrieve the data from the two or more fact tables of the database.

20 Claims, 4 Drawing Sheets

MULTI-FACT QUERY PROCESSING IN DATA PROCESSING SYSTEM

BACKGROUND

This disclosure relates to software systems, and more specifically, to database queries within enterprise software systems.

Enterprise software systems are typically sophisticated, large-scale systems that support many, e.g., hundreds or thousands, of concurrent users. Examples of enterprise software systems include inventory management systems, budget planning systems, order management systems, sales force management systems, business intelligence tools, enterprise reporting tools, project and resource management systems, and other enterprise software systems.

A computing device for a user typically connects to the enterprise software system using a computing network. The user computing device may provide an operating environment for execution of an enterprise software application that may be used to generate reports for review of information, such as average product price, cost per employee, sales targets, and the like. Often, the information used to generate the reports may be stored in a relational database, a multidimensional database, or both. A reporting component of the enterprise software application typically submits one or more queries to the database to retrieve and manipulate information used to generate the reports.

In certain database systems, information is organized using tables, including rows and columns, which specify data or relations among tables. Such database systems may typically organize data according to a relational star or snowflake schema. Both star and snowflake schemas organize data using centralized fact tables that reference multiple dimension tables. In addition, dimension tables of a snowflake schema may reference multiple related "snowflake" tables. For complex business scenarios, it is not uncommon for star or snowflake schemas to include multiple fact tables.

Information may be retrieved from the database using queries issued to the database system. For example, queries that conform to the structured query language (SQL), commonly referred to as SQL queries, may be used to retrieve data from one or more tables of the database. However, such queries may require the database system to operate over large amounts of data. For instance, in a data warehouse environment, a database system may operate over terabytes of data, performing multiple joins or other aggregation operations, thereby resulting in long response times.

BRIEF SUMMARY

In one example, a method includes receiving, by a query optimizer executing on one or more processors of a computing device, a multi-fact star schema query that is executable by the computing device to retrieve data from two or more fact tables of a database, and internally transforming, by the query optimizer, the multi-fact star schema query into a group of single-fact sub-queries, wherein each sub-query of the group of single-fact sub-queries references only one of the two or more fact tables. The method further includes enumerating, by the query optimizer, the group of sub-queries to determine a query execution plan, and executing, by a runtime execution engine executing on the one or more processors, the multi-fact star schema query according to the query execution plan to retrieve the data from the two or more fact tables of the database.

In another example, a computer-readable storage medium is encoded with instructions that, when executed, cause one or more processors of a computing device to receive, by a query optimizer executing on the one or more processors, a multi-fact star schema query that is executable by the computing device to retrieve data from two or more fact tables of a database, and internally transform, by the query optimizer, the multi-fact star schema query into a group of single-fact sub-queries, wherein each sub-query of the group of single-fact sub-queries references only one of the two or more fact tables. The computer-readable storage medium is further encoded with instructions that, when executed, cause the one or more processors of the computing device to enumerate, by the query optimizer executing on the one or more processors, the group of sub-queries to determine a query execution plan, and execute, by a runtime execution engine executing on the one or more processors, the multi-fact star schema query according to the query execution plan to retrieve the data from the two or more fact tables of the database.

In another example, a computing device includes one or more processors and a query optimizer, executable by the one or more processors to receive a multi-fact star schema query that is executable by the computing device to retrieve data from two or more fact tables of a database. The computing device further includes a multi-fact transformation engine, executable by the one or more processors to internally transform the multi-fact star schema query into a group of single-fact sub-queries, wherein each sub-query of the group of single-fact sub-queries references only one of the two or more fact tables. The computing device further includes an optimizer join enumerator, executable by the one or more processors to enumerate the group of sub-queries to determine a query execution plan, and a runtime execution engine, executable by the one or more processors to execute the multi-fact star schema query according to the query execution plan to retrieve the data from the two or more fact tables of the database.

The details of one or more aspects of this disclosure are set forth in the accompanying drawings and the description below. Other features, objects, and advantages of the disclosure will be apparent from the description and drawings, and from the claims.

DETAILED DESCRIPTION

To improve efficiency and reduce response times, some database systems perform optimizations to process star schema queries. However, when processing queries that reference multiple fact tables of a star or snowflake schema (i.e., multi-fact queries), conventional techniques may constrain or over-simplify the optimization operations. For example, certain conventional techniques require the creation of composite indexes on each of the fact tables that include columns in the same relative order. Such techniques may require the composite indexes to be maintained as the information in the fact tables increases, decreases, or otherwise changes. As another example, certain conventional techniques treat all but one fact table as dimension tables. However, such a simplification may result in less than optimal performance with respect to multi-fact queries. Moreover, conventional techniques typically use a common dimension table to filter only one fact table. As such, other fact tables may not make use of that common dimension table for filtering.

Techniques are described herein that allow a multi-fact query (i.e., a query that references two or more fact tables of a star or snowflake schema) to be optimized without the conventional requirement that composite indexes relating to the multiple fact tables follow the same relative order or use a common dimension table to filter only one fact table. Moreover, techniques described herein allow star schema optimization techniques that have been conventionally used with single-fact queries (i.e., queries that reference one fact table of a star or snowflake schema) to be used when optimizing multi-fact queries. While query processing, the techniques internally transform a multi-fact query into constituent single-fact sub-queries. The transformed internal representation of the multi-fact query is optimized using star schema processing techniques. Enumeration techniques are described to generate a query execution plan that accounts for each join combination of the internally transformed query. Moreover, the enumeration techniques described herein allow common dimension tables to be referenced multiple times by the internally transformed query.

Figure 1:
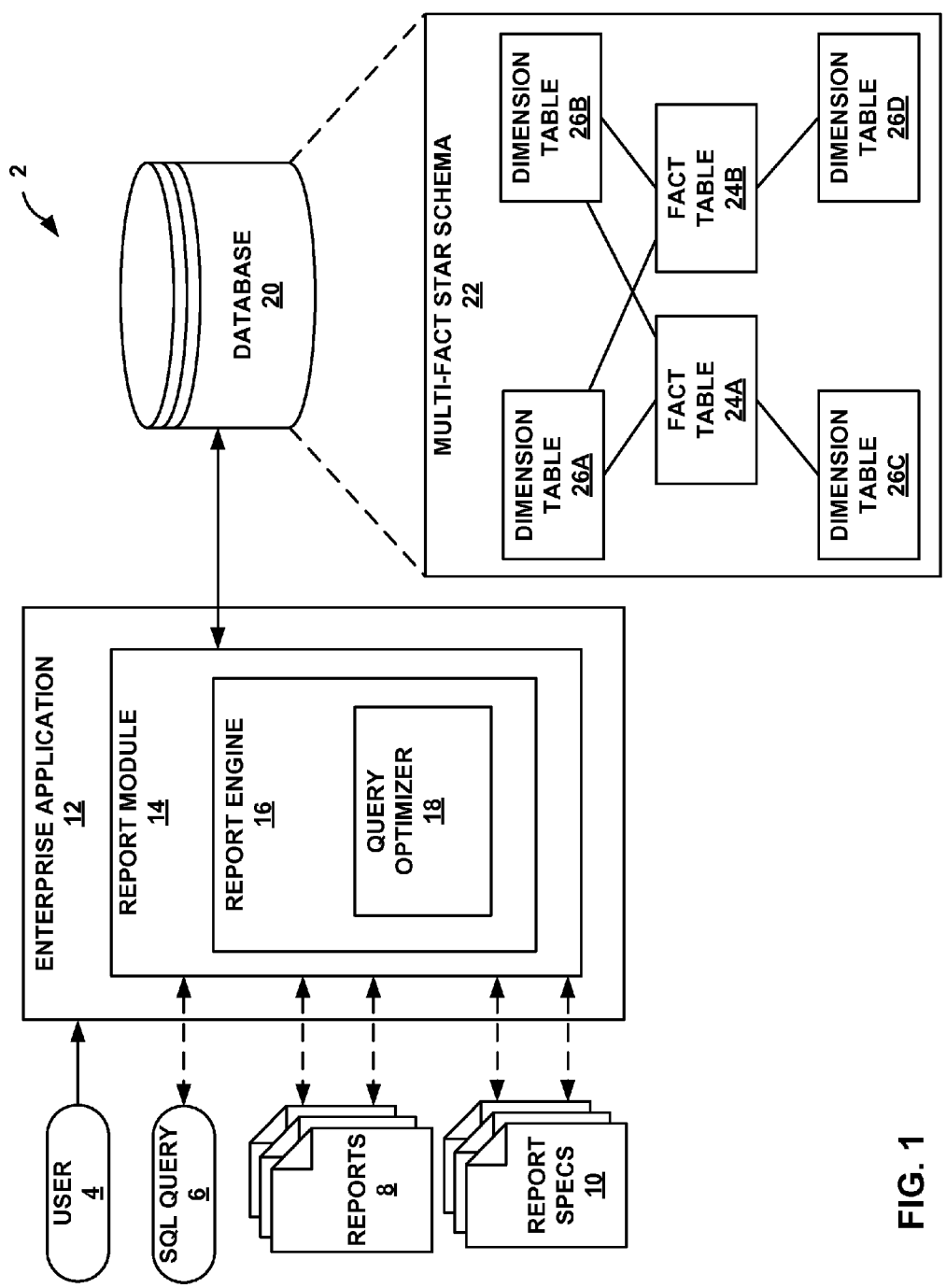
FIG. 1 is a block diagram illustrating an example enterprise software system for generating a report using data retrieved from a database, in accordance with one or more aspects of this disclosure.

FIG. 1 is a block diagram illustrating an example computing system 2 in which an enterprise application 12 includes a report module 14 that performs query optimizing operations to optimize queries when generating reports 8. Although described for exemplary purposes with respect to enterprise application 12, the techniques described herein may be applied to any software system that performs query optimization operations to manipulate underlying data and construct reports, either in response to user input or pre-defined report specifications 10. In the example of FIG. 1, enterprise application 12 may be any software application that manipulates and processes underlying data from database 20. In this example, enterprise application 12 may be a suite of business intelligence software tools or performance management and enterprise planning systems, such as an enterprise-wide financial management system or budget planning system. The techniques described herein may be readily applied to other software systems, including other large-scale enterprise software systems. Examples of enterprise software systems include order management systems, inventory management systems, sales force management systems, business intelligent tools, enterprise reporting tools, project and resource management systems and other enterprise software systems.

In the example system shown in FIG. 1, user 4 interacts with enterprise application 12 to generate reports 8. Enterprise application 12 may include a suite of tools that may enable user 4 to contribute, retrieve, analyze, and visualize enterprise information, such as product price, product sale, projected sales of a product, and the like. For example, enterprise application 12 may include reporting tools, modeling tools, spreadsheet applications, data collection templates, business intelligence tools, or other types of enterprise application tools.

In the example of FIG. 1, enterprise application 12 includes report module 14 that allows user 4 to retrieve information from database 20 to generate reports 8. Report module 14 may provide a user interface to enable user 4 to specify information to be retrieved. For example, user 4 may provide one or more queries that conform to the structured query language (SQL), commonly referred to as SQL queries. As illustrated in FIG. 1, user 4 may provide SQL Query 6.

As one example, user 4 may specify parameters relating to cost data for a particular product line for a particular year, parameters relating to projected sales of a product, and the like. During this process, user 4 may direct report engine 16 to construct one or more queries to be processed and issued to database 20, and may retrieve the specified information based on the query. In one example, report module 14 may create a report 8 for user 4 based on one or more report specifications 10. Report specifications 10 may be simpler to create for certain users than detailed, individual queries. That is, users with less technical knowledge than typically required to compose database queries may nevertheless be able to create report specifications 10 by interacting with a user interface presented by report module 14. Report specification 10 may be written in a reporting language that hides intricacies of a query language (e.g., MDX).

Database 20 may organize data according to a relational star or snowflake schema. Both star and snowflake schemas organize data using centralized fact tables that reference multiple dimension tables. In addition, dimension tables of a snowflake schema reference one or more related "snowflake" tables. Fact tables include quantitative information (e.g., facts) that may be aggregated, analyzed, or otherwise used to generate reports 8. Such factual information is often numerical data, and may consist of many columns and large numbers of row (e.g., millions or billions of rows).

Fact tables may reference one or more dimension tables using a primary key-foreign key relationship. That is, fact tables may include one or more foreign keys that relate to one or more primary keys of a dimension table. Similarly, dimension tables may include one or more foreign keys that are primary key references from one or more other tables. As such, a dimension table may be considered a referenced table (e.g., referenced from one or more fact tables). Dimension tables include information that may be descriptive of the measures of a fact table. Dimension tables may be viewed as lookup tables, each of which contains information relating to measures of a related fact table.

For complex business scenarios, it is not uncommon for star or snowflake schemas to include multiple fact tables, each of which referencing multiple dimension tables. Such schemas may be referred to as multi-fact star or snowflake schemas. In certain examples, two or more fact tables may reference one or more common dimension tables. As illustrated in FIG. 1, database 20 may organize data according to multi-fact star schema 22.

Multi-fact star schema 22 includes fact tables 24A and 24B (collectively referred to as "fact tables 24"). In addition, multi-fact star schema 22 includes dimension tables 26A, 26B, 26C, and 26D (collectively "dimension tables 26"). In the example of FIG. 1, fact table 24A references dimension tables 26A, 26C, and 26D. As such, fact table 24A may include one or more foreign keys that relate to one or more primary keys of dimension tables 26A, 26C, and 26D. Similarly, dimension tables 26A, 26C, and 26D may include one or more foreign keys that are primary key references of fact table 24A. Using similar primary key-foreign key references, fact table 24B references dimension tables 26A, 26B, and 26D.

As one example, fact table 24A may track daily sales to a customer of a store for a particular time period. Fact table 24B may include a daily forecast for a product sold through a particular store for a particular time period. In such an example, dimension table 26A may include information regarding stores, dimension table 26B may include information regarding time periods, dimension table 26 C may include information regarding customers, and dimension table 26D may include information regarding products. As such, dimension table 26A (e.g., a store dimension in the present example) and dimension table 26B (e.g., a period dimension in the present example) may be considered common dimensions that join with both fact tables 24A and 24B. In contrast, dimension tables 26C and 26D may be considered uncommon dimensions that join with one of fact tables 24, but not both.

Some conventional query processing techniques may apply query optimization operations when processing single-fact star schema queries. For instance, one such optimization strategy, known as "zigzag join" or "join with fact index feedback," may be used to optimize single-fact star schema queries. A zigzag join optimization strategy utilizes a database index structure to improve the speed of data retrieval operations for a star schema query. In the case of a zigzag join strategy, multi-column index structures (commonly referred to as composite indexes), may be used to improve the speed of data retrieval on multiple columns of a fact table. However, to optimize a multi-fact star schema query, conventional techniques typically require that the relative order of composite index columns on the fact tables are the same.

For instance, in the example of FIG. 1, if a query (e.g., SQL Query 6) joins dimension table 26A and dimension table 26B with fact table 24A and fact table 24B, conventional optimization techniques require that both fact table 24A and fact table 24B have a composite index including dimension table 26A and dimension table 26B in the same relative order. That is, conventional zigzag join techniques would not be able to optimize such a query when, for example, fact table 24A includes the composite index on foreign keys in fact table 24A joining with the primary keys in the dimensions (dimension table 26A, dimension table 26B) respectively, and fact table 24B includes the composite index on foreign keys in fact table 24B joining with primary keys in the dimensions (dimension table 24B, dimension table 24A) respectively, because the relative order of the dimension tables in the composite indexes is not the same.

In complex business scenarios, the number of fact tables included in a multi-fact star schema may be much greater than two. As such, the conventional constraint that all composite indexes of fact tables must have the index columns in the same relative order may become unmanageable. Because multi-column indexes must be maintained to keep such a relative order among the fact tables, it may be impracticable to create and maintain the large number of composite indexes that may be required for the fact tables as the data in the fact tables increases, decreases, or otherwise changes. Moreover, conventional techniques may enable common dimension tables (e.g., dimension tables 26A and 26B) to be used to filter only one fact table (e.g., either fact table 24A or fact table 24B, but not both).

Report module 14 may perform one or more query optimization operations on a query that references multiple fact tables of database 20, and may perform such optimization operations without requiring that entries to composite indexes relating to the multiple fact tables follow the same relative order. Moreover, report module 14 may use query optimization techniques that have conventionally been developed for use with queries that reference a single fact table (e.g., zigzag join, starjoin index anding, and the like) to optimize a query that references multiple fact tables of database 20.

As illustrated in FIG. 1, report engine 16 includes query optimizer 18 that performs query optimization operations to optimize queries to be issued to database 20. Query optimizer 18 may perform such query optimization operations on a query that references multiple fact tables of database 20. For instance, query optimizer 18 may perform internal transformation operations to transform a multi-fact star schema query into a group of constituent single-fact sub-queries (e.g., queries that reference a single fact table of the multi-fact star schema). As in the example of FIG. 1, query optimizer 18 may perform internal transformation operations on a query that joins dimension tables 26 and fact tables 24. Query optimizer 18 may internally transform such a multi-fact star schema query into two single-fact star schema queries. For instance, query optimizer 18 may transform such a query into a first single-fact query joining dimension tables 26A, 26B, and 26C with fact table 24A, and a second single-fact query joining dimension tables 26A, 26B, and 26D with fact table 24B.

As such, query optimizer 18 may use query processing techniques, such as zigzag join, starjoin index anding, or other star join processing strategies, to generate an optimized star query processing plan using the constituent single-fact queries resulting from the internal transformation. Query optimizer 18 may perform such query optimization techniques on the constituent single-fact sub-queries without requiring that composite indexes on the fact tables (e.g., fact tables 24) follow the same relative order. In addition, query optimizer 18 performs join enumeration operations using the star query processing plan to generate an optimized query execution plan. Moreover, techniques are described herein in which query optimizer 18 performs such join enumeration operations using a star query processing plan that includes multiple references to a common dimension table.

Figure 2:
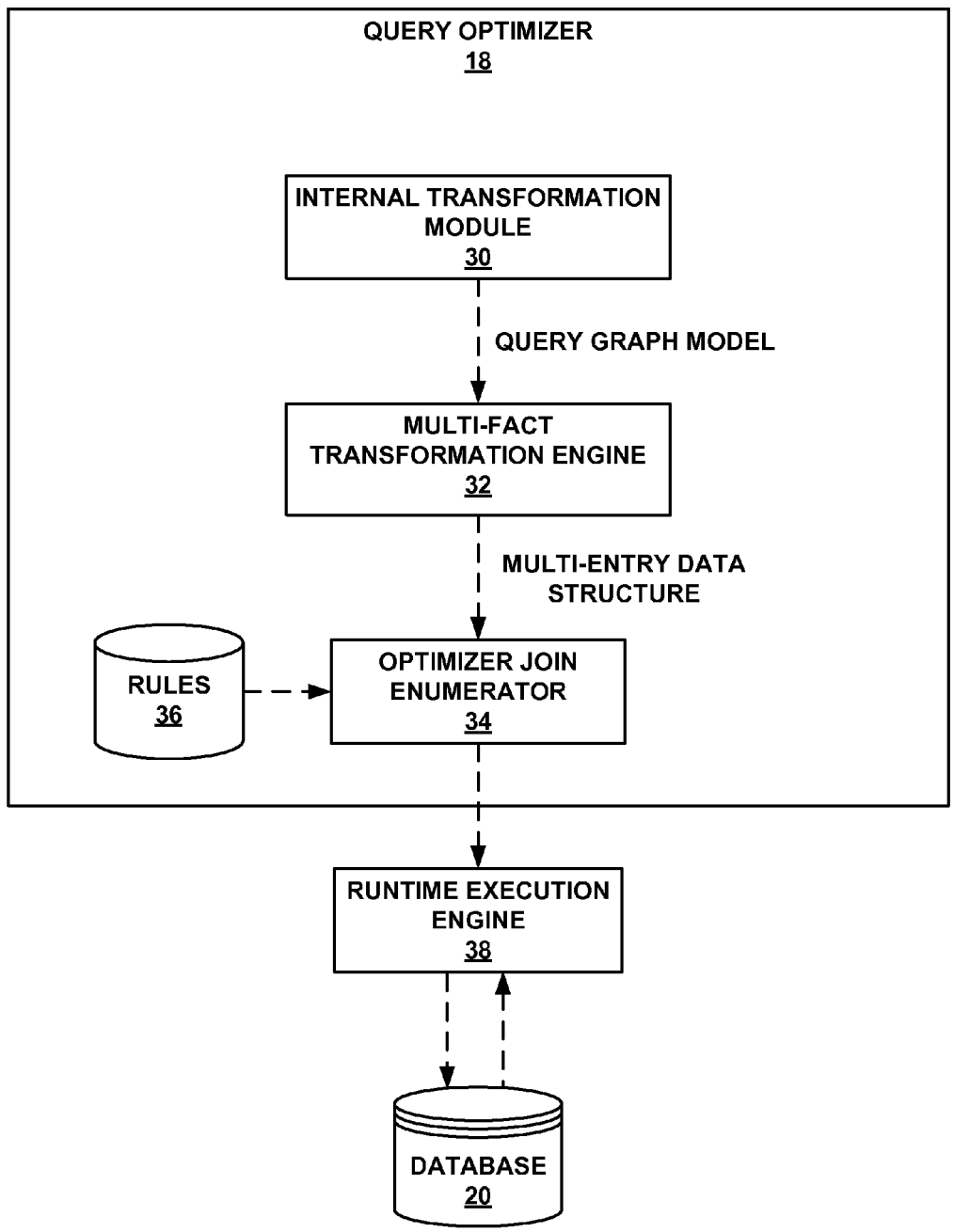
FIG. 2 is a block diagram illustrating an example of certain components of the query optimizer of FIG. 1 in further detail.

FIG. 2 is a block diagram illustrating an example of certain components of query optimizer 18 of FIG. 1 in further detail. As illustrated in FIG. 2, query optimizer 18 includes internal transformation module 30, multi-fact transformation engine 32, optimizer join enumerator 34, and enumeration rules 36. Report module 16 may receive an input specifying information to be retrieved from database 20. As an example, report module 14 may provide a user interface enabling user 4 to specify information to be retrieved (e.g., cost data for a particular product line for a particular year).

User 4 may specify one or more SQL Queries 6 to select information from database 20. As another example, user 4 may direct report engine 16 to construct one or more queries to be processed and issued to database 20, and may retrieve the specified information based on the query. For instance, user 4 may select one or more report specifications 10. Report module 14 may construct one or more queries and create report 8 for user 4 based on the one or more selected report specifications 10.

Internal transformation module 30 processes the query to generate one or more internal data structures for use in query optimization. For example, internal transformation module 30 may generate a query graph model to represent the query as it is processed from query parsing through query rewrite, optimization, and execution. In such an example, the query graph model may include one or more internal data structures to represent the logical relationships and entities (e.g., tables, columns, predicates, etc.) of the query. Query optimizer 18 may use the query graph model to analyze the query semantics and to obtain information relating to the query, such as indexes, base tables, derived tables, sub-queries, correlation, recursion, and the like.

Multi-fact transformation engine 32 uses the internal data structure generated by internal transformation module 30 to analyze the query and perform internal transformation operations. For example, multi-fact transformation engine 32 may use the query graph model to analyze the internal relationships among tables referenced in the query, and may determine that the query is a multi-fact star schema query (e.g., the query references multiple fact tables of a star schema). In such case, multi-fact transformation engine 32 may perform internal transformation operations to transform the multi-fact star schema query into multiple constituent single-fact sub-queries.

Multi-fact transformation engine 32 generates a multi-entry data structure to represent the internally transformed query. For example, multi-fact transformation engine 32 may generate an array of structures, where each entry in the array corresponds to a single-fact star. Each structure in the array of structures may store or reference data that is representative of the single fact table, the joining dimension tables, join predicates of the query, or other information that is descriptive of the single-fact star.

As an example, report engine 16 may receive or generate a query that joins dimension tables 26 and fact tables 24 of multi-fact schema 22. Internal transformation module 30 generates an internal data structure (e.g., a query graph model) for use in query optimization. Multi-fact transformation engine 32 analyzes the internal data structure to determine that the query is a multi-fact star schema query that references both fact tables 24A and 24B. Multi-fact transformation engine 32 performs internal transformation operations to transform the multi-fact star schema query into constituent single-fact sub-queries. In the present example, multi-fact transformation engine 32 generates a first constituent single-fact sub-query that joins dimension tables 26A, 26B, and 26C with fact table 24A. Multi-fact transformation engine 32 generates a second constituent single-fact sub-query that joins dimension tables 26A, 26B, and 26D with fact table 24B.

Multi-fact transformation engine 32 further generates a multi-entry data structure, such as the multi-entry data structure described above, to represent the internally transformed query. For instance, in the present example, the multi-entry data structure may include a first element of an array that stores or references a structure including information that identifies the fact table of the first single-fact sub-query (i.e., fact table 24A) and the dimension tables of the first single-fact sub-query (i.e., dimension tables 26A, 26B, and 26C). Similarly, the multi-entry data structure may include a second element of the array that stores or references a structure including information that identifies the fact table of the second single-fact sub-query (i.e., fact table 24B) and the dimension tables of the second single-fact sub-query (i.e., dimension tables 26A, 26B, and 26D). Multi-fact transformation engine 32 uses query optimization techniques (e.g., zigzag join optimization strategies) to generate an optimized star query processing plan using the constituent single-fact queries resulting from the internal transformation.

Optimizer join enumerator 34 applies enumeration rules 36 when processing the multi-entry data structure to generate an optimized query execution plan. Optimizer join enumerator 34 generates candidate plans for execution of the query using enumeration rules 36. Enumeration rules 36 include various enumeration techniques for selecting information from a table, table join operations, aggregation operations, etc.

Optimizer join enumerator 34 may first determine candidate plans based on each individual table of the query. For instance, optimizer join enumerator 34 may evaluate a candidate query execution plan using various enumeration rules 36. Optimizer join enumerator 34 determines which of the candidate plans is optimal based on one or more decision criteria, such as cost-based decisions, heuristic-based decisions, a combination of cost and heuristic bases, and the like.

Cost-based decision criteria may assign an estimated runtime cost to each candidate query execution plan, such as by evaluating cost factors such as the number of input or output operations associated with the plan, the central processor unit (CPU) requirements associated with execution of the plan, or other similar cost factors. Heuristic-based decision criteria may apply a set of criteria that may typically improve execution performance (e.g., reduce the execution time of the query), such as performing selection operations early in the plan, performing projection operations early in the plan, performing the most restrictive selection and join operations before other similar operations, and the like.

Optimizer join enumerator 34 may generate candidate plans based on each individual table of the query. Next, optimizer join enumerator 34 updates the candidate plans to account for join operations specified in the query. Example join enumeration methods include dynamic programming, greedy join enumeration, and the like.

For instance, according to a dynamic programming enumeration method, optimizer join enumerator 34 begins the join enumeration optimization by evaluating joins of two tables against the decision criteria (e.g., cost-based decision criteria, heuristic-based decision criteria, etc.) Optimizer join enumerator 34 applies various join enumeration techniques specified by enumeration rules 36 to each possible join combination specified by the query.

As an example, a single-fact star schema query included in the multi-entry data structure generated by multi-fact transformation engine 32 may specify a join of tables A, B, and C. In such an example, optimizer join enumerator 34 evaluates various join enumeration techniques against the decision criteria with respect to joins of tables A and B, joins of tables A and C, and joins of tables B and C. As such, optimizer join enumerator 34 generates candidate plans for execution of the query based on joins of two tables specified in the query.

Next, optimizer join enumerator 34 extends the candidate plans to account for further join operations specified in the query. For instance, in the present example, optimizer join enumerator 34 evaluates various candidate join plans (e.g., (A) joined with (B,C), (B) joined with (A,C) and (C) joined with (A,B), and so on) for each combination of tables A, B, and C. As such, optimizer join enumerator 34 extends the candidate plans to account for further join operations specified in the query. Optimizer join enumerator 34 extends the candidate plans to account for each table specified in the join operation of the query. That is, if a query specifies a join of tables A, B, C, and D, optimizer join enumerator 34 extends the candidate plans to account for the join of each combination of the four tables A, B, C, and D.

However, because conventional dynamic programming and greedy enumeration techniques extend the candidate plans to account for only the number of tables specified in the join operation of the query, such conventional techniques may not effectively enumerate a multi-fact star schema query that has been internally transformed into multiple single-fact sub-queries. For instance, as in the example of FIG. 1, a multi-fact star schema query against multi-fact star schema 22 may join dimension tables 26A, 26B, 26C, and 26D with fact tables 24A and 24B. Such a join operation specifies a join of six tables of database 20. As such, according to conventional enumeration techniques, a query optimizer may extend candidate plans to account for the join of six tables.

However, in the present example, multi-fact transformation engine 32 may perform internal transformation operations to transform the multi-fact star schema query into two constituent single-fact sub-queries. For instance, multi-fact transformation engine 32 may transform such a multi-fact star schema query into a first single-fact sub-query joining dimension tables 26A, 26B, and 26C with fact table 24A, and a second single-fact sub-query joining dimension tables 26A, 26B, and 26D with fact table 24B. As such, the internally transformed query includes a join of eight tables. Therefore, conventional enumeration techniques may not extend candidate query execution plans to account for each join combination specified by the internally transformed star schema query.

Moreover, conventional enumeration techniques typically constrain candidate query execution plans such that no duplicate tables may be specified in the candidate plan. For instance, conventional enumeration techniques may typically consider a candidate plan that specifies a join operation of table A with the join partition of tables A and B to be invalid because table A is specified more than once in the candidate plan.

Techniques are described herein in which optimizer join enumerator 34 performs enumeration operations to extend candidate query execution plans to account for each join combination specified by a multi-fact star schema query that has been internally transformed into multiple single-fact sub-queries. For example, as described herein, optimizer join enumerator 34 may apply over-enumeration techniques to account for all possible join combinations of such transformed queries. In addition, according to techniques of this disclosure, when considering candidate plans for execution of a transformed query, optimizer join enumerator 34 removes the conventional constraint that no duplicate tables may be specified in the candidate plan.

As such, optimizer join enumerator 34 determines which of the candidate plans is optimal based on one or more decision criteria (e.g., cost-based decision criteria, heuristic-based decision criteria, and the like). Runtime execution engine 38, of report module 14, executes the query according to the optimal plan and returns the resulting data set to report module 14. Report module 14 may use the resulting data set to generate reports 8.

Figure 3:
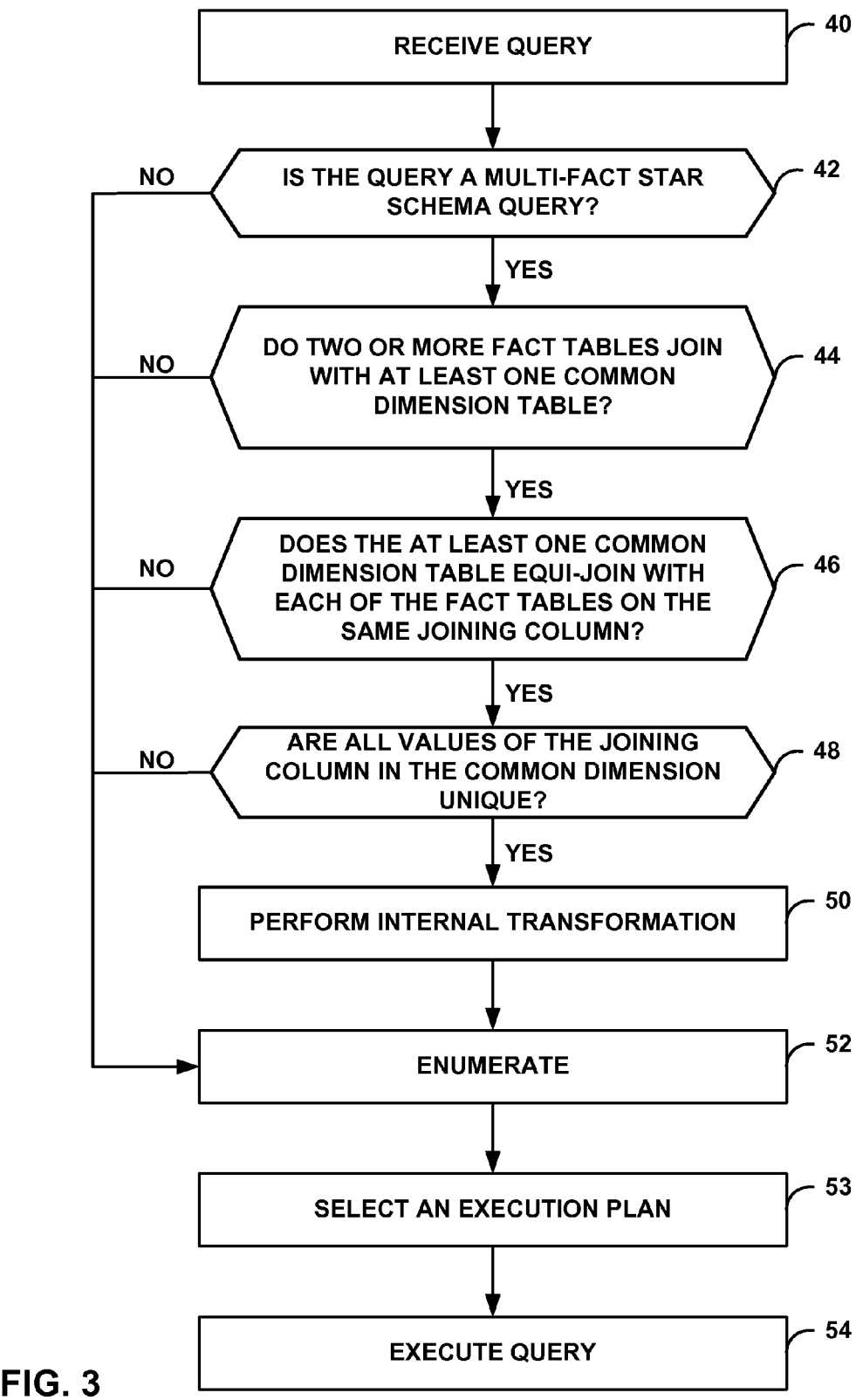
FIG. 3 is a flow diagram illustrating an example operation of an enterprise application for internally transforming a multi-fact star schema query into multiple single-fact sub-queries.

FIG. 3 is a flow diagram illustrating an example operation of an enterprise application 12 for internally transforming a multi-fact star schema query 22 into multiple single-fact sub-queries. Multi-fact transformation engine 32 may perform transformation operations to internally transform a received multi-fact star schema query into constituent single-fact sub-queries. However, it is important the results returned from database 20 in response to execution of the transformed query are valid. That is, if the results returned in response to the transformed query do not match the results that would be returned in response to execution of the original (i.e., non-transformed) query, the transformed query may be considered invalid. In contrast, when the results returned in response to the transformed query match the results that would be returned in response to execution of the original query, the transformed query may be considered valid.

To ensure that the transformed query returns valid results, multi-fact transformation engine 32 imposes constraints on the internal transformation techniques. For example, as described herein, multi-fact transformation engine 32 imposes certain decision criteria prior to performing the internal transformation operations. When the decision criteria are not met, optimizer join enumerator 24 enumerates the original (i.e., non-transformed) query to generate a query execution plan. In contrast, when the decision criteria are met, multi-fact transformation engine 32 internally transforms the multi-fact star schema query into a group of single-fact sub-queries, and optimizer join enumerator 34 enumerates the transformed query to generate the query execution plan.

Report module 14 may receive a query to select information from two or more tables of database 20 (40). For example, user 4 may provide SQL Query 6. As another example, user 4 may select one or more report specifications 10, specifying one or more such queries. Internal transformation module 30 processes the query to generate one or more internal data structures for use in query optimization (e.g., a query graph model).

Multi-fact transformation engine 32 may use the one or more internal data structures to analyze the received query and determine whether the query is a multi-fact star schema query (42). For example, multi-fact transformation engine 32 may determine that the query references two or more fact tables of database 20 and a dimension table of the database. When multi-fact transformation engine 32 determines that the received query is not a multi-fact star schema query ("NO" branch of 42), optimizer join enumerator 34 may enumerate the query to generate a query execution plan. In such case, optimizer join enumerator 34 may use enumeration techniques such as zigzag join, starjoin index anding, or other enumeration techniques to generate the query execution plan.

When multi-fact transformation engine 32 determines that the received query is a multi-fact star schema query ("YES" branch of 42), multi-fact transformation engine 32 may determine whether the received multi-fact star schema query joins two or more fact tables with at least one common dimension table (44). A common dimension table may be a dimension table that is referenced by each of the two or more fact tables of the query. For instance, as in the example of FIG. 1, dimension table 26A may be considered a common dimension table of a query against multi-fact star schema 22 because both fact table 24A and fact table 24B reference dimension table 26A. When multi-fact transformation engine 32 determines that the received query does not join two fact tables with at least one common dimension table ("NO" branch of 44), optimizer join enumerator 34 may enumerate the query to generate a query execution plan.

When multi-fact transformation engine 32 determines that the received query joins two or more fact tables with at least one common dimension table ("YES" branch of 44), multi-fact transformation engine 32 may determine whether the at least one common dimension table of the query equi-joins with each of the two or more fact tables on the same joining column of the common dimension table (46). As one example, the received query may specify a join of a common dimension table D with fact tables F1 and F2. The query may further specify an equi-join operation of dimension table D with fact table F1 on a column d1 of dimension table D. Similarly, the query may specify an equi-join operation of dimension table D with fact table F2 on the column d1 of dimension table D. In such an example, multi-fact transformation engine 32 may determine dimension table D equi-joins with each of fact tables F1 and F2 on the same joining column d1.

As another example, the received query may specify a join of a common dimension table D with fact tables F1 and F2, but may specify an equi-join operation of dimension table D with fact table F1 on a column d1 of dimension table D and may further specify an equi-join operation of dimension table D with fact table F2 on a column d2 of dimension table D. In such an example, multi-fact transformation engine 32 may determine that dimension table D does not equi-join with each of fact tables F1 and F2 on the same joining column because the received query specifies a join operation of dimension table D with fact table F1 on a different joining column of dimension table D than the join operation of dimension table D with fact table F2. That is, in the present example, the query specifies the joining column d1 of dimension table D with fact table F1 but specifies the different joining column d2 of dimension table D with fact table F2.

When multi-fact transformation engine 32 determines that no common dimension table equi-joins with each of the two or more fact tables on the same joining column ("NO" branch of 46), optimizer join enumerator 34 may enumerate the query to generate a query execution plan. When multi-fact transformation engine 32 determines that the received query specifies that at least one common dimension table equi-joins with each of the fact tables on the same joining column ("YES" branch of 46), multi-fact transformation engine 32 may determine whether all data values of the joining column of the common dimension table are unique (48). As such, multi-fact transformation engine 32 may determine that the joining column from the common dimension table has no duplicate values.

When multi-fact transformation engine 32 determines that the data values of the joining column of the common dimension table are not all unique ("NO" branch of 48), optimizer join enumerator 34 may enumerate the query to generate a query execution plan. When multi-fact transformation engine 32 determines that all data values of the joining column of the common dimension table are unique ("YES" branch of 48), multi-fact transformation engine 32 may perform internal transformation operations to internally transform the multi-fact star schema query into a group of single-fact sub-queries (50).

For instance, as in the example of FIG. 1, multi-fact transformation engine 32 may internally transform a received query against multi-fact star schema 22 into a first single-fact sub-query and a second single-fact sub-query. The first single-fact sub-query may join dimension tables 26A, 26B, and 26C with fact table 24A. The second single-fact sub-query may join dimension tables 26A, 26B, and 26D with fact table 24B.

Optimizer join enumerator 34 may enumerate the query to generate a set of candidate query execution plans (52). When multi-fact transformation engine 32 has not internally transformed the received multi-fact star schema query into constituent single-fact sub-queries (e.g., "NO" branches of 44, 46, or 48), optimizer join enumerator 34 may use star schema-specific join enumeration techniques or non-star schema-specific join enumeration techniques to generate a set of candidate query execution plans from the original query. For instance, in certain examples, optimizer join enumerator 34 may use star schema-specific join enumeration techniques such as zigzag join, starjoin index anding, and the like to generate a set of candidate query execution plans using the non-transformed query. However, as discussed above, such techniques typically require that composite indexes on each fact table include column entries in the same relative order. In examples when no such composite indexes exist (or when the column entries do not follow the same relative order), optimizer join enumerator may use non-star schema-specific enumeration techniques to generate the set of candidate query execution plans.

When multi-fact transformation engine 32 has internally transformed the received multi-fact star schema query into constituent single-fact sub-queries (e.g., as in element 50 of the example operation), optimizer join enumerator 34 may enumerate the internally transformed query, i.e., the resultant single-fact sub-queries, to generate the set of candidate query execution plans. Optimizer join enumerator 34 may use enumeration techniques such as zigzag join, dynamic programming, or greedy join enumeration to optimize each of the single-fact sub-queries. In addition, optimizer join enumerator 34 may create a single query execution plan to execute the multiple single-fact sub-queries using a single optimized query. As such, the transformation of the multi-fact star schema into a group of single-fact sub-queries may be internal to query optimizer 18. That is, query optimizer 18 generates a query execution plan using the multiple single-fact sub-queries and executes a single query according to the plan.

Moreover, optimizer join enumerator 34 may perform over-enumeration techniques to account for all possible join combinations of the internally transformed query. For instance, as discussed above, conventional enumeration techniques typically extend candidate query execution plans to account for only the number of tables specified in the join operation of the query. However, the internal transformation of a multi-fact star schema query into multiple single-fact sub-queries may result in a transformed query that includes a greater number of tables than the original (i.e., non-transformed) query. For instance, as discussed above with respect to the example of FIG. 1, multi-fact transformation engine 32 may transform a query joining dimension tables 26 with fact tables 24 according to multi-fact star schema 22 (i.e., a join specifying six tables) into multiple single-fact sub-queries, the resulting transformation including eight tables.

At a maximum, a multi-fact star schema query may specify join operations to join all the dimension tables with all the fact tables. As such, optimizer join enumerator 34 may perform over-enumeration operations to account for all possible join combinations of the transformed query according to the following equation:

$$\text{Tables}_T = (\text{num\_dims} \times \text{num\_facts}) + \text{num\_facts}$$

where $\text{Tables}_T$ is the number of table join combinations that optimizer join enumerator 34 over-enumerates, num_dims is the number of dimension tables referenced in the original (i.e., non-transformed) multi-fact star schema query, and num_facts is the number of fact tables referenced in the original multi-fact star schema query.

As one example, report module 14 may receive a multi-fact star schema query to join three dimension tables and two fact tables. Rather than enumerate the received query to account for possible join combinations of five tables (i.e., three dimension tables in addition to two fact tables), optimizer join enumerator 34 may over-enumerate the multi-fact star schema query to account for possible join combinations of eight tables.

As such, optimizer join enumerator 34 may perform over-enumeration operations to generate candidate query execution plans that account for all possible join combinations of the internally transformed query. Optimizer join enumerator 34 may select an execution plan from the set of candidate execution plans (53). For example, optimizer join enumerator 34 may determine the optimal query execution plan from the candidate plans based on one or more decision criteria, such as cost-based decisions, heuristic-based decisions, a combination of cost and heuristic bases, and the like.

Runtime execution engine 38 may execute the query according to the optimal query execution plan (54). For example, runtime execution engine 38 may execute the query against database 20 according to the query execution plan that was determined by optimizer join enumerator 34 to be the optimal query execution plan. Runtime execution engine 38 may return the resulting dataset to report module 14, which may use the resulting dataset to generate reports 8.

Figure 4:
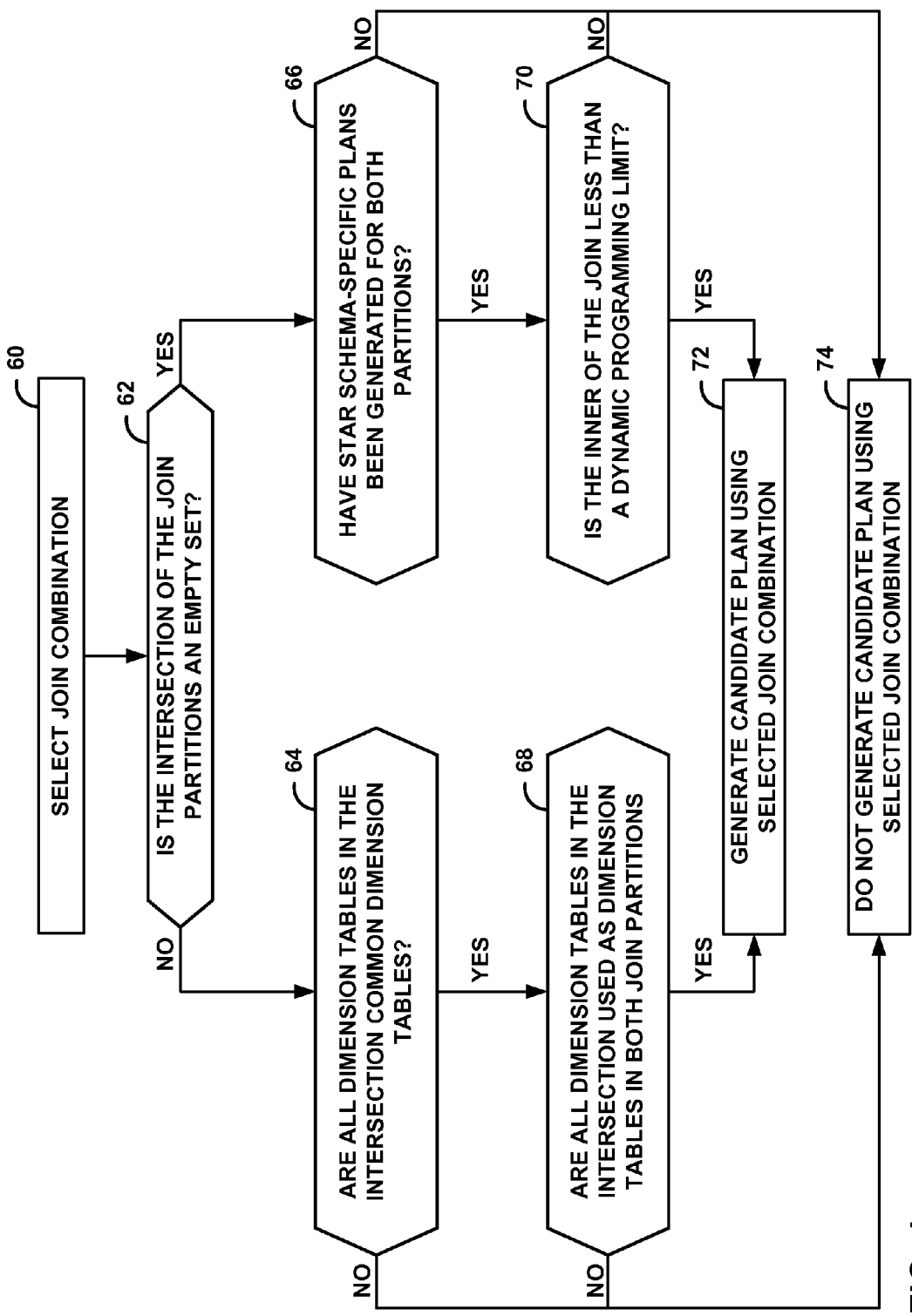
FIG. 4 is a flow diagram illustrating an example operation of an optimizer join enumerator for generating one or more query execution plans.

FIG. 4 is a flow diagram illustrating an example operation of an optimizer join enumerator 34 for generating one or more candidate query execution plans, i.e., enumeration phase (52) of FIG. 3. Optimizer join enumerator 34 may perform over-enumeration operations to generate candidate query execution plans that account for all possible join combinations of a multi-fact star schema query that has been internally transformed into multiple single-fact sub-queries. While generating such candidate plans, optimizer join enumerator 34 imposes certain validation criteria on the join combinations to determine whether a particular join combination may be used to generate a valid candidate plan. When a particular join combination does not satisfy the validation criteria, optimizer join enumerator 34 does not use the join combination to generate a candidate query execution plan. However, when a particular join combination satisfies the validation criteria, optimizer join enumerator 34 uses the join combination to generate a candidate query execution plan.

As such, optimizer join enumerator 34 may generate one or more candidate query execution plans, and may select an optimal query execution plan from the group of candidate query execution plans. For instance, optimizer join enumerator 34 may evaluate each of the group of candidate query execution plans against one or more decision criteria (e.g., cost-based decisions, heuristic-based decisions, combinations of cost and heuristic bases, and the like), and may select an optimal query execution plan based on the decision criteria.

Optimizer join enumerator 34 may perform over-enumeration operations resulting in a group of join combinations. For instance, a received query may join tables A, B, C, D, E, and F. Optimizer join enumerator 34 may select a join combination from the group of join combinations (60). For example, optimizer join enumerator 34 may perform over-enumeration operations resulting in a join combination of a join partition including a join of tables A, B, C, and D with a join partition including a join of tables A, B, and E.

Optimizer join enumerator 34 may determine whether the intersection of the join partitions results in an empty set (62). Such an intersection may be considered to be the set of tables that are included in both join partitions of the join combination. For example, the intersection of a join partition including tables A, B, C, and D with a join partition including tables A, B, and E may be considered to be the set of tables including tables A and B. In contrast, the intersection of a join partition including tables A, B and C with a join partition including tables D, E and F may be considered to be an empty set, because no tables are common between the two join partitions.

When optimizer join enumerator 34 determines that the intersection of the join partitions is not an empty set ("NO" branch of 62), optimizer join enumerator 34 may determine whether all dimension tables in the intersection are common dimension tables to the multi-fact star schema (64). Common dimension tables may be considered to be those dimension tables that join with all fact tables of the multi-fact star schema query. For instance, in the example of FIG. 1, dimension tables 26A and 26B may be considered common dimension tables because each joins with both fact table 24A and fact table 24B.

When optimizer join enumerator 34 determines that not all of the dimension tables in the intersection are common dimension tables ("NO" branch of 64), optimizer join enumerator 34 may determine that the selected join combination is not to be used to generate candidate query execution plans. When optimizer join enumerator 34 determines that all of the dimension tables in the intersection are common dimension tables ("YES" branch of 64), optimizer join enumerator 34 may determine whether all of the dimension tables in the intersection are used as dimension tables in both join partitions (68). For example, optimizer join enumerator 34 may select a join combination including a first join partition of table A, and a second join partition of tables A, B, C, and D. In such an example, optimizer join enumerator 34 may determine that the intersection of the join partitions is table A. However, optimizer join enumerator 34 may determine that the join combination is not a valid combination because table A is not used as a dimension table in the first join partition.

When optimizer join enumerator 34 determines that not all dimension tables in the intersection are used as dimension tables in both join partitions ("NO" branch of 68), optimizer join enumerator 34 may determine that the selected join combination is not to be used to generate candidate query execution plans. When optimizer join enumerator 34 determines that all dimension tables in the intersection are used as dimension tables in both join partitions ("YES" branch of 68), optimizer join enumerator 34 may use the selected join combination to generate candidate query execution plans.

When optimizer join enumerator 34 determines that the intersection of the join partitions is an empty set ("YES" branch of 62), optimizer join enumerator 34 may determine whether star schema-specific plans have been generated for both join partitions (66). For example, when the intersection of the join partitions is an empty set (i.e., no tables are common to both join partitions), optimizer join enumerator 34 may compare each of the join partitions to the join combinations that optimizer join enumerator 34 has already used during the enumeration techniques to generate candidate query execution plans. Optimizer join enumerator 34 may determine that the join combination may be valid when optimizer join enumerator 34 has used the join combinations of both join partitions to generate candidate plans, because such a join combination may be associated with two separate single-fact stars.

When optimizer join enumerator 34 determines that star schema-specific plans have not been generated for both join partitions ("NO" branch of 66), optimizer join enumerator 34 may determine that the selected join combination is not to be used to generate candidate query execution plans. When optimizer join enumerator 34 determines that star schema-specific plans have been generated for both join partitions, optimizer join enumerator 34 may determine whether the inner of the join is less than the limit imposed by the dynamic programming enumerator (70). For instance, dynamic programming enumerators typically impose a maximum limit to the number of tables on the inner of a join. When the inner of the join of the two join partitions exceeds such a limit ("NO" branch of 70), optimizer join enumerator 34 may determine that the selected join combination is not to be used to generate candidate query execution plans. However, when the inner of the join does not exceed such a limit ("YES" branch of 70), optimizer join enumerator 34 may use the selected join combination to generate candidate query execution plans. In such an example, optimizer join enumerator 34 selects a next join combination in the group of join combinations resulting from the over-enumeration techniques. As such, optimizer join enumerator 34 selects each of the join combinations in the group of join combinations to determine whether to use the selected join combination to generate one or more candidate query execution plans.

In certain examples (e.g., "YES" branch of 68 or 70), optimizer join enumerator 34 may use the selected join combination to generate candidate query execution plans (72). For instance, optimizer join enumerator 34 may evaluate the selected join combination using various techniques (e.g., sort-merge join, hash join, nested loop join, and the like) to generate candidate query execution plans. In other examples (e.g., "NO" branch of 64, 66, 68, or 70), optimizer join enumerator 34 may determine that the selected join combination is not to be used to generate query execution plans (74). In such examples, optimizer join enumerator 34 selects a next join combination in the group of join combinations resulting from the over-enumeration techniques. Optimizer join enumerator 34 selects each of the join combinations in the group of join combinations to determine whether to use the selected join combination to generate one or more candidate query execution plans.

Optimizer join enumerator 34 may evaluate the one or more candidate query execution plans against decision criteria (e.g., cost-based, heuristic-based, combinations of cost and heuristic bases, etc.) to determine an optimal query execution plans from the one or more candidate plans. Runtime execution engine 38 may execute the query according to the optimal query execution plan to select information from database 20. Query optimizer 18 may return the resulting data set to report module 14. Report module 14 may use the resulting data set to generate reports 8.

The examples described above have been discussed with respect to multi-fact star schema queries including two fact tables. However, it should be understood that techniques of this disclosure are not so limited. The techniques described herein may be used to process multi-fact star schema queries that reference two or more fact tables (e.g., two, three, four, five, or more fact tables). Similarly, the techniques of this disclosure may be used with respect to star or snowflake schemas without restriction on the number of dimension tables, snowflake tables, or the complexity of such schemas.

The techniques described in this disclosure may be implemented, at least in part, in hardware, software, firmware, or any combination thereof. For example, one or more aspects of this disclosure may be implemented using one or more computing devices. Such computing devices may include or be a part of an application server, database server, workstation, or other computing system. Examples of such computing devices may include, but are not limited to, one or more portable computing devices (e.g., a mobile phone, netbook, laptop, personal digital assistant (PDA), tablet device, and the like), one or more desktop computer, or one or more servers.

Various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

The techniques described in this disclosure may also be embodied or encoded in an article of manufacture including a computer-readable storage medium encoded with instructions. In some embodiments, an article of manufacture may include more than one computer-readable storage media. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media.

In some embodiments, a computer-readable storage medium may include a non-transitory medium. The term "non-transitory" may indicate that the storage medium is not a carrier wave or a propagated signal. In certain embodiments, a non-transitory storage medium may store data that can, over time, change (e.g., in RAM or cache). In the context of this document, a computer readable storage medium may be any tangible medium that can contain, or store a program for use by or in connection with an instruction execution system, apparatus, or device.

Any combination of one or more computer readable medium(s) may be utilized. The computer readable medium may be a computer readable storage medium or a computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Various aspects of the disclosure have been described. These and other aspects are within the scope of the following claims.

The invention claimed is:

1. A method comprising:
receiving, by a query optimizer executing on one or more processors of a computing device, a multi-fact star schema query that is executable to retrieve data from two or more fact tables of a database, wherein the two or more fact tables each references a common dimension table of the database;
internally transforming, by the query optimizer, the multi-fact star schema query into a group of single-fact sub-queries, wherein each sub-query of the group of single-fact sub-queries references only one of the two or more fact tables;
enumerating, by the query optimizer, the group of single-fact sub-queries to determine a query execution plan; and
executing, by a runtime execution engine executing on the one or more processors, the multi-fact star schema query according to the query execution plan to retrieve the data from the two or more fact tables of the database.

2. The method of claim 1, wherein internally transforming the multi-fact star schema query into the group of single-fact sub-queries is performed responsive to:
(i) determining that the multi-fact star schema query equi-joins the common dimension table and each of the two or more fact tables on a common joining column of the common dimension table, wherein the common joining column comprises one or more data values; and
(ii) determining that each of the one or more data values of the joining column of the common dimension table are unique within the joining column.

3. The method of claim 1, wherein enumerating the group of single-fact sub-queries further comprises:
determining a set of join combinations, each of the join combinations having a first join partition and a second join partition, wherein the first and second join partitions each comprise a reference to at least one of the two or more fact tables of the multi-fact star schema query;
generating candidate query execution plans for one or more of the set of join combinations; and
selecting, based on decision criteria, one of the candidate query execution plans for executing the multi-fact star schema query.

4. The method of claim 3, wherein the first and second join partitions each comprise a reference to the common dimension table.

5. The method of claim 3, wherein generating the candidate query execution plans comprises:
for each of the join combinations:
determining an intersection of the first and second join partitions, wherein the intersection comprises references to one or more dimension tables of the database that are common to both the first join partition and the second join partition; and
generating the candidate query execution plan for the respective join combination based on the intersection of the first and second join partitions.

6. The method of claim 5, further comprising, when the intersection comprises an empty set, generating the candidate query execution plan for the respective join combination responsive to:
(i) determining that a star schema-specific candidate query execution plan has been generated for each of the first and second join partitions; and (ii) determining that an inner of a join of the first and second join partitions does not exceed an dynamic programming inner join limit.

7. The method of claim 5, further comprising, when the intersection does not comprise an empty set, generating the candidate query execution plan for the respective join combination responsive to:
for each of the one or more dimension tables of the database that are common to both the first join partition and the second join partition:
(i) determining that the received multi-fact star schema query joins the respective dimension table with each of the two or more fact tables of the multi-fact star schema query; and
(ii) determining that the respective dimension table is referenced in both the first and second join partitions as a dimension table.

8. A computer-readable storage medium encoded with instructions that, when executed, cause one or more processors of a computing device to:
receive, by a query optimizer executing on the processor, a multi-fact star schema query that is executable to retrieve data from two or more fact tables of a database, wherein the two or more fact tables each references a common dimension table of the database;
internally transform, by the query optimizer, the multi-fact star schema query into a group of single-fact sub-queries, wherein each sub-query of the group of single-fact sub-queries references only one of the two or more fact tables;
enumerate, by the query optimizer, the group of single-fact sub-queries to determine a query execution plan; and
execute, by a runtime execution engine, the multi-fact star schema query according to the query execution plan to retrieve the data from the two or more fact tables of the database.

9. The computer-readable storage medium of claim 8, wherein the instructions to internally transform the multi-fact star schema query into the group of single-fact sub-queries further comprise instructions to internally transform responsive to:
(i) determining that the multi-fact star schema query equi-joins the common dimension table and each of the two or more fact tables on a common joining column of the common dimension table, wherein the common joining column comprises one or more data values; and
(ii) determining that each of the one or more data values of the joining column of the common dimension table are unique within the joining column.

10. The computer-readable storage medium of claim 8, wherein the instructions to enumerate the group of single-fact sub-queries further comprise instructions to:
determine a set of join combinations, each of the join combinations having a first join partition and a second join partition, wherein the first and second join partitions each comprise a reference to at least one of the two or more fact tables of the multi-fact star schema query;
generate candidate query execution plans for one or more of the set of join combinations; and
select, based on decision criteria, one of the candidate query execution plans for executing the multi-fact star schema query.

11. The computer-readable storage medium of claim 10, wherein the first and second join partitions each comprise a reference to the common dimension table.

12. The computer-readable storage medium of claim 10, wherein the instructions to generate the candidate query execution plans further comprise instructions to:
for each of the join combinations:
determine an intersection of the first and second join partitions, wherein the intersection comprises references to one or more dimension tables of the database that are common to both the first join partition and the second join partition; and
generate the candidate query execution plan for the respective join combination based on the intersection of the first and second join partitions.

13. The computer-readable storage medium of claim 12, further comprising instructions to:
when the intersection comprises an empty set, generate the candidate query execution plan for the respective join combination responsive to:
(i) determining that a star schema-specific candidate query execution plan has been generated for each of the first and second join partitions; and
(ii) determining that an inner of a join of the first and second join partitions does not exceed an dynamic programming inner join limit.

14. The computer-readable storage medium of claim 12, further comprising instructions to:
when the intersection does not comprise an empty set, generate the candidate query execution plan for the respective join combination responsive to:
for each of the one or more dimension tables of the database that are common to both the first join partition and the second join partition:
(i) determining that the received multi-fact star schema query joins the respective dimension table with each of the two or more fact tables of the multi-fact star schema query; and
(ii) determining that the respective dimension table is referenced in both the first and second join partitions as a dimension table.

15. A computing device, comprising:
one or more processors;
a query optimizer executable by the one or more processors to receive a multi-fact star schema query that is executable to retrieve data from two or more fact tables of a database, wherein the two or more fact tables each references a common dimension table of the database;
a multi-fact transformation engine executable by the one or more processors to internally transform the multi-fact star schema query into a group of single-fact sub-queries, wherein each sub-query of the group of single-fact sub-queries references only one of the two or more fact tables;
an optimizer join enumerator executable by the one or more processors to enumerate the group of single-fact sub-queries to determine a query execution plan; and
a runtime execution engine executable by the one or more processors to execute the multi-fact star schema query according to the query execution plan to retrieve the data from the two or more fact tables of the database.

16. The computing device of claim 15, wherein the multi-fact transformation engine is further executable by the one or more processors to internally transform the multi-fact star schema query into the group of single-fact sub-queries responsive to:
(i) determining that the multi-fact star schema query equi-joins the common dimension table and each of the two or more fact tables on a common joining column of the dimension table, wherein the common joining column comprises one or more data values; and (ii) determining that each of the one or more data values of the joining column of the common dimension table are unique within the joining column.

17. The computing device of claim 15, wherein the optimizer join enumerator is further executable by the one or more processors to:

determine a set of join combinations, each of the join combinations having a first join partition and a second join partition, wherein the first and second join partitions each comprise a reference to at least one of the two or more fact tables of the multi-fact star schema query;

generate candidate query execution plans for one or more of the set of join combinations; and select, based on decision criteria, one of the candidate query execution plans for executing the multi-fact star schema query.

18. The computing device of claim 17, wherein the optimizer join enumerator is further executable by the one or more processors to generate the candidate query execution plans by:

for each of the join combinations:

determining an intersection of the first and second join partitions, wherein the intersection comprises references to one or more dimension tables of the database that are common to both the first join partition and the second join partition; and generating the candidate query execution plan for the respective join combination based on the intersection of the first and second join partitions.

19. The computing device of claim 18, wherein the optimizer join enumerator is further executable by the one or more processors to:

when the intersection comprises an empty set, generate the candidate query execution plan for the respective join combination responsive to:

(i) determining that a star schema-specific candidate query execution plan has been generated for each of the first and second join partitions; and (ii) determining that an inner of a join of the first and second join partitions does not exceed an dynamic programming inner join limit.

20. The computing device of claim 18, wherein the optimizer join enumerator is further executable by the one or more processors to:

when the intersection does not comprise an empty set, generate the candidate query execution plan for the respective join combination responsive to:

for each of the one or more dimension tables of the database that are common to both the first join partition and the second join partition:

(i) determining that the received multi-fact star schema query joins the respective dimension table with each of the two or more fact tables of the multi-fact star schema query; and (ii) determining that the respective dimension table is referenced in both the first and second join partitions as a dimension table.

\* \* \* \* \*